United States Patent

Esser

[11] 3,986,733
[45] Oct. 19, 1976

[54] WATER OUTLETS
[75] Inventor: Klaus Esser, Dusseldorf, Germany
[73] Assignee: Klaus Esser KG, Dusseldorf, Germany
[22] Filed: May 5, 1975
[21] Appl. No.: 574,372

[30] Foreign Application Priority Data
May 10, 1974 Germany............................ 2422658

[52] U.S. Cl................................. 285/158; 285/376
[51] Int. Cl.² ............................................ F16L 3/04
[58] Field of Search .................. 285/42, 43, 44, 56, 285/57, 58, 59, 60, 360, 361, 158, 376, 396, 401, 402, 110, 189; 4/218; 52/553, 11

[56] References Cited
UNITED STATES PATENTS
| | | | |
|---|---|---|---|
| 655,672 | 8/1900 | Engel | 285/376 X |
| 2,421,228 | 5/1947 | White | 285/361 X |
| 2,522,757 | 9/1950 | Larson | 285/189 X |
| 2,839,316 | 6/1958 | Kasper | 285/158 X |

Primary Examiner—Dave W. Arola
Attorney, Agent, or Firm—Donald D. Jeffery

[57] ABSTRACT

A water outlet has a collector funnel for water to be drained from a roof surface or the like. A ring is fitted, with a groove and projection bayonet-type fixing, in the funnel, and thereby secures to the funnel a covering sheet or film. The sheet is intended to extend over an annular flange on the funnel, and be joined to the roof surface, to seal the outlet to the roof surface. The ring is preferably embedded in the sheet.

3 Claims, 3 Drawing Figures

3,986,733

WATER OUTLETS

BACKGROUND OF THE INVENTION

A water drain or outlet for removing water from surfaces or areas such as flat roofs, balconies, terraces or the like, often has a collector funnel into which water to be drained flows, then being discharged by way of a pipe portion that may be connected for example to a drain pipe. The funnel may have an annular flange for supporting on and possibly connection to the roof covering, while a connecting covering sheet may be secured to the roof covering and cover the flange, the sheet being secured to the outlet, in particular the funnel portion, by a securing ring. Alternatively, the roof covering itself may be clamped to the outlet by the ring, in which case the covering sheet can be omitted. Thus, the roof covering or the sheet may be clamped in the water outlet without using separate fixing means, apart from the ring, between the outside peripheral surface of the clamping ring and the inside wall of the funnel. However, such a clamping ring can reliably seal the roof covering or the sheet only when the ring is sufficiently firmly seated in place, and this makes it necessary to observe precise production tolerances.

In another form of water outlet, an annular insert is fitted into the collector funnel, while between the insert and the roof covering or the covering sheet, which is inserted into the funnel, there is placed a closed spreader member which may be provided with sealing lips and which presses the covering or the sheet against the inside wall of the funnel.

Apart from the fact that, in the above-mentioned construction with sealing lips, the sharp edges of the lips can cut into the roof covering or the sheet, and, if a heavy loading is applied, can even cause it to tear, both the above-mentioned water outlets have components which are separate from each other and/or from the main component of the outlet. These separate components therefore require separate storage. There is also the danger that some of these components can be lost during transportation or in the process of assembly.

In yet another form of water outlet which comprises heat-barrier plastic foam, a plastic film or sheet may be moulded or formed with the outlet in the region of the support flange, that is to say, the water outlet and the connection sheet form a single unit. While this construction does not require additional components for connecting the sheet to the funnel, in the event of damage to the sheet during storage or assembly the entire water outlet may have to be discarded; in the event of damage to the sheet after the water outlet has been built into place, the outlet must be removed from the roof construction, and this can involve considerable expense and work.

SUMMARY OF THE INVENTION

An object of the invention is that of providing a water outlet of the general kind set out above, which permits more simple storage and at the same time also permits replacement of the connection or covering sheet, for example in the event of damage thereto.

A further object of the invention is to provide a water outlet which is easier to assemble than prior devices in which the connection sheet is separate from the main part of the outlet.

In a water outlet according to the invention, the funnel for collecting drainage water has an annular flange for resting on the roof surface, while a ring fits inside the funnel. Fixed to the ring is a connection film or sheet which at least partially covers the peripheral surface of the ring. Two or more grooves which in plan view are substantially L-shaped are provided in the wall of the funnel, each groove having an enlarged portion at its closed end. Projections provided on the ring engage into the grooves to secure the ring and thus the sheet to the outlet funnel.

This arrangement provides that the ring which connects the connection film or sheet to the funnel forms a unit with the film, and thus virtually only two components, namely the water outlet body portion and the ring with integral film need to be kept in storage or transported to the building site. It would be apparent however that the water outlet could even be provided with the ring at the place of work. There is thus the advantage with this construction the ring, which is pre-produced with the connection film, is connected to the funnel by simply being turned into the grooves, and it can no longer be released from the funnel, even in the event of loads being applied thereto, for example expansion and contraction and settlement movements, by virtue of the said projections being disposed in the enlarged portions of the grooves.

In an advantageous form of the invention, the ring is enclosed by the connection film on all its sides.

In order to ensure that the ring is permanently resiliently supported in the funnel, the connection film can be formed into at least one sealing lip, in the region of the ring.

DESCRIPTION OF THE PREFERRED EMBODIMENTS

Figure 1:
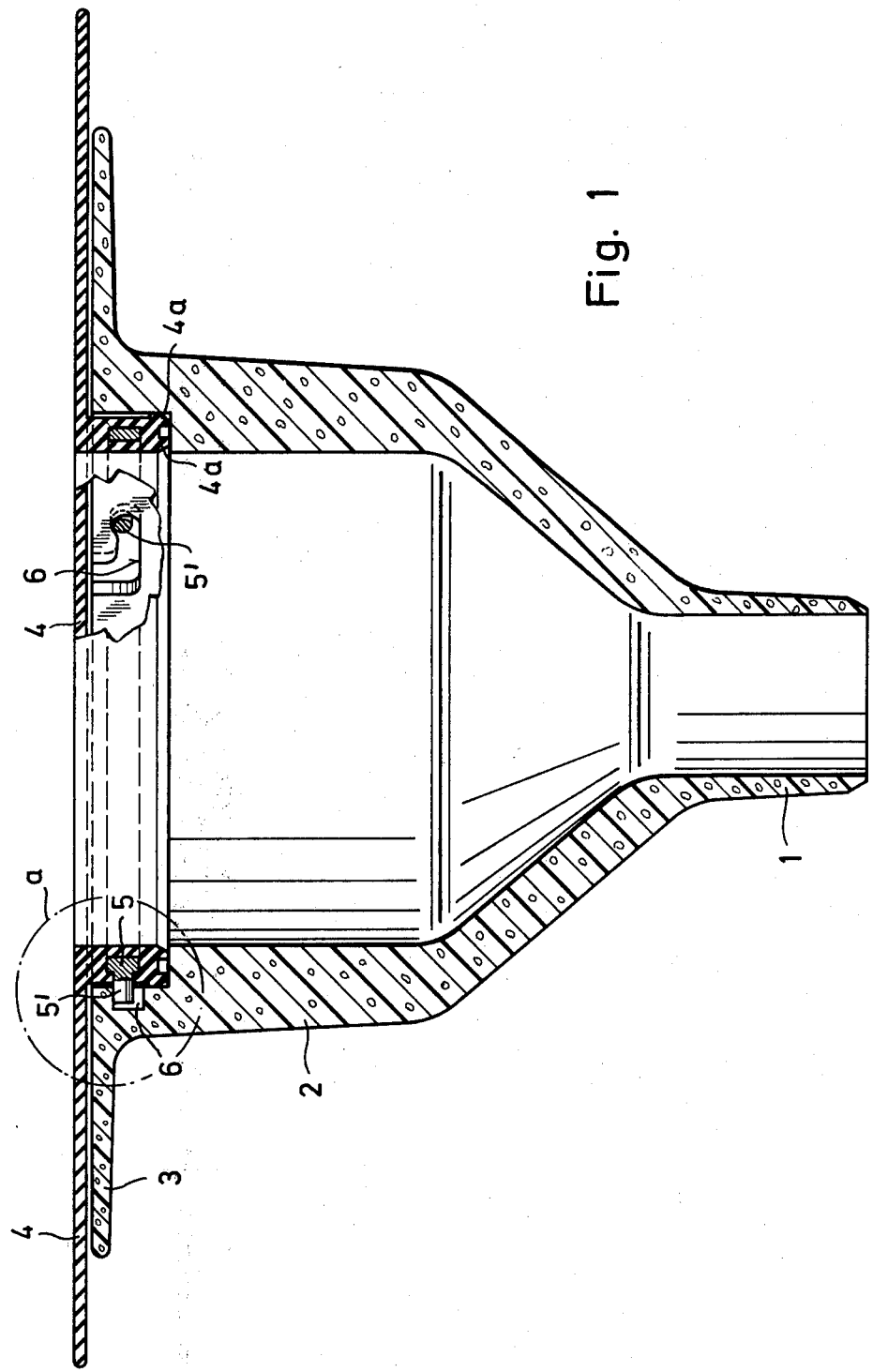
FIG. 1 shows a view in cross-section of the water outlet.
Figure 1A:
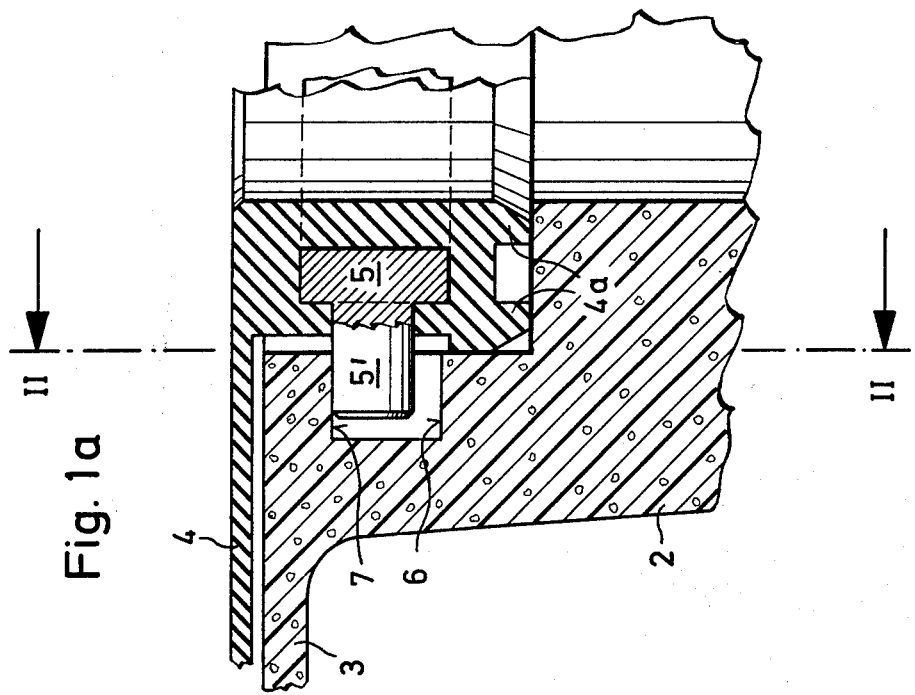
FIG. 1a shows a detail of the water inlet of FIG. 1.
Figure 2:
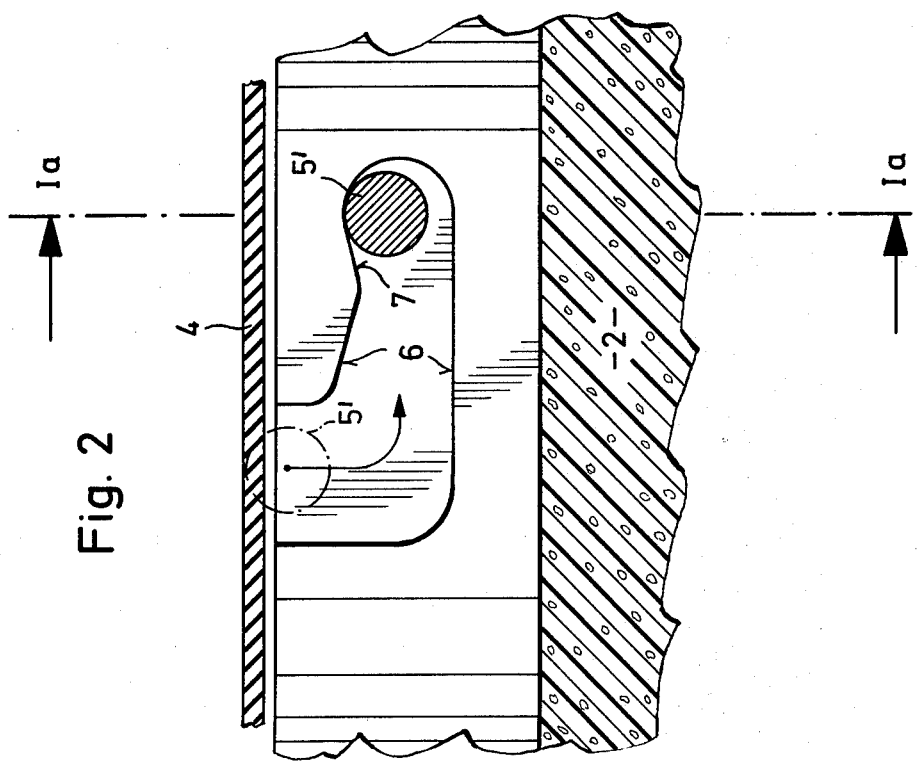
FIG. 2 shows a groove in the wall of the funnel, with the respective starting and end positions of a corresponding projection received in said groove.

Referring to the drawings, a water drainage outlet comprises a cylindrical discharge pipe connection 1 and connected thereto a collector funnel portion 2. The funnel portion 2 has an integral annular flange 3 at its upper end, the flange 3 resting on the surface such as a roof covering to be drained, to support the outlet in a position of use. A connection or covering sheet or film 4 which covers the flange 3 is fixedly connected to a ring 5 by a suitable method such as adhesive or vulcanising. The sheet 4 at least partially covers the peripheral surface of the ring 5; in the illustrated embodiment, the ring is totally covered by the sheet 4. The sheet 4 has sealing lips 4a (see in particular FIG. 1a) which bear against the adjacent surfaces of the funnel portion 2. The ring 5 has radially outward projections 5', while provided in the wall of the funnel portion 2 are two or more, preferably three, L-shaped grooves 6 (FIG. 2) into which the respective projections 5' of the ring 5 can engage. At its closed end (towards the right in FIG. 2) each groove 6 has an enlarged portion 7 in which the respective projection 5' is disposed in its end position of fixing of the ring 5. Thus, to assemble the outlet, the ring 5 with sheet 4 attached integrally thereto is fitted into the mouth of the funnel portion 2, with each projection 5' entering the entrance end of the respective groove 6; a projection 5' is shown in this position in dash-dotted line in FIG. 2. The ring is then turned so that each projection 5' is moved into the enlarged portion 7 of the respective groove 6, the portion 7 thus retaining the projection 5' therein, due to its illustrated configuration, as shown in solid line in FIG. 2. The sheet 4 thus covers the flange 3 and may be joined to the surface on which the flange 3 bears, to seal the outside of the outlet.

What is claimed is:

1. A water outlet for draining a surface such as flat roofs, balconies, terraces and the like, comprising a funnel portion, an annular flange on the funnel portion, a sheet means for covering the flange and fitting on said surface, and a ring for securing the sheet means to the funnel portion, the ring having a peripheral surface and being fixedly connected to the sheet means and the sheet means at least partially covering the peripheral surface of the ring, a surface of the funnel portion providing at least two grooves of substantially L-shaped configuration, each groove having an elongated portion at its closed end, and the ring providing at least two projections for engaging into the respective grooves, to secure the ring in the funnel portion.

2. An outlet according to claim 1 wherein the ring is fully enclosed by the sheet means.

3. An outlet according to claim 1 wherein the sheet means is formed into at least one sealing lip in the region of the ring, for bearing against an associated surface of the funnel portion.

* * * * *